United States Patent [19]

Gilmore

[11] Patent Number: 4,753,814
[45] Date of Patent: Jun. 28, 1988

[54] PROCESS FOR PREPARING A CARAMEL BUTTERSCOTCH FLAVOR SYRUP

[75] Inventor: Lisa T. Gilmore, Hackensack, N.J.

[73] Assignee: Lever Brothers Company, New York, N.Y.

[21] Appl. No.: 67,667

[22] Filed: Jun. 26, 1987

[51] Int. Cl.⁴ .................... A23L 1/226; A23L 1/22; A23L 2/26; A23D 5/00; A23G 3/32
[52] U.S. Cl. .................... 426/533; 426/613; 426/650; 426/658; 426/534
[58] Field of Search ............ 426/533, 658, 650, 613, 426/534

[56] References Cited

U.S. PATENT DOCUMENTS

| | | | |
|---|---|---|---|
| 3,622,343 | 11/1971 | Anwar | 426/658 |
| 3,663,236 | 5/1972 | Holloway | 426/533 |
| 4,528,205 | 7/1985 | Turrisi | 426/658 |
| 4,684,532 | 8/1987 | Izzo | 426/533 |

FOREIGN PATENT DOCUMENTS 7712745  5/1979  Netherlands .................. 426/533

Primary Examiner—Donald E. Czaja
Assistant Examiner—Helen Pratt
Attorney, Agent, or Firm—Milton L. Honig; James J. Farrell

[57] ABSTRACT

A process is disclosed for obtaining a caramel butterscotch flavored aqueous phase composition comprising heating an admixture of an aqueous solution of sugar and butter in a ratio of 50:1 to 1:10 at a temperature of about 100° F. to 250° F. for about 0.5–5 hours. Heating is done in the presence of a base catalyst with the admixture held at a pH of at least 7. The resultant emulsion is separated to recover an aqueous phase having the caramel butterscotch flavor. When the aqueous phase is incorporated into a low calorie table syrup, the resultant product has excellent butterscotch flavor impact and the syrup maintains its clear composition.

8 Claims, No Drawings

PROCESS FOR PREPARING A CARAMEL BUTTERSCOTCH FLAVOR SYRUP

BACKGROUND OF THE INVENTION

1. Field of the Invention

The invention relates to a process for obtaining an aqueous butterscotch flavored composition, and foods such as low calorie syrups containing the flavored composition.

2. The Prior Art

Consumers are becoming more calorie conscious. Yet, they do not wish to forego their favorite desserts and syrup toppings. Instead, they demand foods of lower calorie content that still retain the flavor and feel of the more weighty traditional high caloric foods. These needs have been recognized by the food industry. In particular, with regard to the present invention, there has been sought a low calorie syrup having the taste of caramel butterscotch found in full calorie syrups.

Buttery and butter related flavors, such as butterscotch, have traditionally been provided to full calorie syrups by incorporation of actual butter or derivatives within the syrup composition. In low calorie syrups, with their high water content, there unfortunately arises problems when butter products are sought to be formulated therein. Though butter products are substantially insoluble in all syrups, only when blended in low calorie syrups does unacceptable cloudiness arise. Consumers desire their syrups to be clear.

Phase stability problems have been noted in U.S. Pat. No. 4,528,205 when small amounts of butter were incorporated into a reduced calorie syrup. The patent overcomes the instability problem by formulating the product with a thickener mixture of alginate and clarified xanthan gum. A disadvantage of this approach is the inflexibility of the formulation with regard to thickener and does not solve the adverse cloudy appearance. Combinations of alginate and clarified xanthan gum will provide one type of mouthfeel to the exclusion of different, perhaps more preferable, mouthfeel imparted by other thickener systems.

U.S. Pat. No. 4,684,532 has reported the preparation of an aqueous cooked buttery flavored composition and its use in low calorie syrup. Acceptable phase stability was achieved therewith. The method involved heating an admixture of an aqueous solution of sugar and butter in a ratio of 50:1 to 1:10, respectively, at a temperature of about 150° F. to 250° F. for about 0.5 to 5 hours. An oil in sugar water emulsion resulted. Upon separation of the fatty phase, an aqueous phase was recovered having a buttery flavor.

A problem was subsequently noted with the aqueous buttery flavored composition produced in the aforementioned process. Although the composition itself had a buttery flavor, once incorporated into a low calorie syrup the resultant formulation had only a minor taste impact. Moreover, consumer taste testing panels have indicated that it is a caramel butterscotch, not a buttery flavor, that consumers expect in a table syrup.

Accordingly, it is an object of this invention to provide a caramel butterscotch flavored composition.

A further object of this invention is to provide a caramel butterscotch flavored composition that has taste impact even when diluted in a low calorie syrup.

A further object of this invention is to provide a reduced calorie syrup having a caramel butterscotch taste.

It is also an object of this invention to provide a caramel butterscotch flavored composition which, upon incorporation into a low calorie syrup, will have acceptable phase stability and organoleptic properties.

A final object of this invention is to provide a caramel butterscotch flavored reduced calorie syrup of good clarity and capable of being formulated with various alternative thickeners.

SUMMARY OF THE INVENTION

A method for preparing a caramel butterscotch flavored composition is provided comprising the steps of:
  (i) heating an admixture of an aqueous solution of sugar and butter in a butter to sugar ratio of 50:1 to 1:10 at a temperature of about 100° F. to 250° F. for about 0.5 to 5 hours resulting in formation of an oil in sugar water emulsion,
    said admixture also containing a catalyst comprising a basic compound which allows the admixture, prior to being heated, to attain a pH of at least about 7; and
  (ii) separating a fatty phase from the emulsion and recovering an aqueous phase, said aqueous phase having a caramel butterscotch flavor.

The invention also provides for use of the foregoing aqueous phase, with its caramel butterscotch flavor, in primarily aqueous food compositions such as reduced calorie syrups, puddings, candy and the like.

In particular, a low calorie edible syrup is provided comprising:
  (i) from about 10 to 45% sugar solids by weight of total syrup, in water;
  (ii) from about 0.01 to 1% of edible preservative; and
  (iii) from about 1 to 10% of the separated caramel butterscotch flavored aqueous phase prepared according to the aforementioned method.

DETAILED DESCRIPTION OF THE INVENTION

Now it has been discovered that a flavor equivalent to that of caramel butterscotch may be obtained by use of a base catalyst in the process described by U.S. Pat. No. 4,684,532. Not all basic compounds are operative. Only those basic compounds are effective which maintain a pH in the aqueous composition, prior to heating, of at least about 7.

The process of U.S. Pat. No. 4,684,532 did not report the need for a catalyst. Without the appropriate catalyst, the process leads to a buttery flavored aqueous composition, not one that tastes of caramel butterscotch. Moreover, the flavor composition prepared without catalyst was found to have only minimal impact when incorporated as a flavorant in a fully formulated low calorie syrup.

Catalysts which are appropriate include any basic compound which renders a pH of at least about 7 to the aqueous admixture prior to heat treatment. The preferred pH lies between 7 and 10, optimally between 7 and 8, but usually at least 7.5. Catalyst concentration may vary from about 0.01 to about 1%, preferably from about 0.01 to about 0.5%, optimally between about 0.03 and 0.3% by weight.

More specifically, suitable catalysts include ammonium, $C_1$-$C_{22}$ alkylammonium, $C_1$-$C_{10}$ alkanolammonium, alkali metal, and alkaline earth metal salts of hydroxide, $C_1$-$C_{22}$ alkoxide, $C_1$-$C_{22}$ carboxylate and carbonate that impart the appropriate pH to the admixture emulsion. For instance, sodium hydroxide, potassium hydroxide, ammonium hydroxide and lithium hydroxide may all be utilized. Ammonium carbonate is another preferred catalyst.

Certain alkaline catalysts, such as sodium carbonate and bicarbonate, in the aforementioned process are also capable of generating a potent butterscotch flavor. However, the taste impact becomes insignificant when the flavor composition is incorporated into the fully formulated low calorie syrup. Sodium carbonate and bicarbonate appear to act as emulsifiers when present at too high a level. As a result of the emulsification, butterfat is carried over into the aqueous phase interferring with clarity of the syrup. Consequently, sodium carbonate, sodium bicarbonate and similar basic materials that promote emulsification of butterfat and lead to fat carry-over into the aqueous phase are excluded as catalysts for purposes of this invention.

The method of flavor preparation involves heating a water solution of sugar with butter and a catalyst at a temperature which may range from about 100° F. up to 250° F. Preferably, the temperature should range from about 150° F. to 230° F., optimally between 170° F. and 230° F. These reactants may be heated together anywhere from about 0.5 to 5 hours depending upon the particular temperature and catalyst employed. At the upper temperature range, for example at 250° F., time is best limited to 0.5 hours or less.

The term "sugar" is intended to embrace sugars broadly and include sucrose, lactose, maltose, dextrose, fructose and mixtures thereof. The amount of sugar to butter will range from 50:1 to 1:10. Preferably, the ratio of these two components will range from 10:1 to 1:1, and optimally about 5:1.

Water is an important component of the flavor generating mixture. It may be introduced with sugar in the form of a sugar syrup to the cook reactor. The amount of water may vary from about 10% to about 50% of the flavor generating cook mixture. Preferably, the amount of water will range from about 20% to about 30%.

An emulsion forms in the reactor after liquid sugar, butter, and catalyst have been heated for the requisite time. In the final step of the process, the fat phase is separated from this emulsion. Separation may readily be accomplished by use of a centrifuge. It was surprising to note that the aqueous phase contained caramel butterscotch flavor but essentially none of the butter fat.

Aqueous phase was used to flavor reduced calorie table syrup. Although directed to table syrups, the aqueous phase caramel butterscotch flavor composition may have other utility such as a flavorant for toppings, puddings, candy and confectioneries.

The following discussion focuses upon reduced calorie syrups into which the present aqueous phase caramel butterscotch flavor may be incorporated. Reduced calorie syrups contain no more than about 70 calories per fluid ounce. It is desirable to avoid artificial sweetening agents. Sugar is present as the primary sweetening agent. Among the types of sugar suitable are cane or beet sugars, sucrose, glucose, maltose, fructose, and high or low conversion corn syrups. The sugar is used in an amount such that the total sugar solids content of the product does not exceed 45% by weight. Sugar solids may range from about 10% to 45%. Preferably, the total is maintained within the range of about 38 to 45% by weight. Lower amounts of sugar can be used with a corresponding reduction in sweetness. Except for the other ingredients disclosed in their specific amounts, water constitutes the balance of the syrup formulation.

To ensure microbiological stability, a small amount of edible preservative is added to the composition. Illustrative preservatives are sodium benzoate, sorbic acid and mixtures thereof. The preservative is present in an amount from about 0.01 to 1% by weight of the total syrup. Preferably, it is present from about 0.1 to 0.5%.

Acidulants and buffers may be present in the syrups. For example, sodium citrate is useful in adjusting pH. These type ingredients are found in amounts ranging from 0.01 to 1.0%.

Anti-flocculents and sugar anti-crystallization additives may be deemed necessary in certain formulations. Sodium hexametaphosphate serves both purposes and, therefore, it is frequently utilized. Cap-lock caused by sugar crystallization is avoided by incorporating this additive. Heavy metals that may exist in the composition are tied-up by sodium hexametaphosphate thereby preventing flocculation. Amounts of these additives generally range from 0.001 to 0.5%; preferably, from 0.01 to 0.10%. Salt may also be present in the formulation in an amount from about 0.1 to 1% to accentuate sweetness.

The following examples will more fully illustrate the embodiments of this invention. All parts, percentages and proportions referred to herein and in the appended claims are by weight unless otherwise indicated.

EXAMPLES 1-13

The following Examples trace the effects of catalyst, catalyst concentration and reaction conditions upon the flavor of an aqueous phase composition and syrups incorporating said composition. Formulations in Table I were prepared from a mixture of aqueous 83% sugar syrup and 17% butter. These ingredients, along with catalyst (where indicated), were heated together in a vessel under agitation. The aqueous and fatty phases were then separated by use of a centrifuge. Flavor evaluations were then performed on the aqueous phase. Taste panels consisted of 3 to 6 expert panelists.

TABLE I

PROCESS PARAMETERS FOR OBTAINING CARAMEL BUTTERSCOTCH AQUEOUS PHASE COMPOSITIONS

| Example No. | Catalyst | Catalyst Concentration (%) | Time (Hrs.) | Temperature (°F.) | Taste Evaluation (Aqueous Phase) | Taste Evaluation and Comments (Formulated Syrup) |
|---|---|---|---|---|---|---|
| 1 | None | — | 3 | 180 | No caramel butterscotch flavor | No impact |
| 2 | None | — | 3 | 220 | Weak caramel butterscotch flavor | Very slight impact |
| 3 | Sodium Bicarbonate | 0.05 | 10 min. | 220 | Strong caramel candy flavor | Boiled over consistently in processing |
| 4 | Sodium Bicarbonate | 0.01 | 3 | 210 | Weak caramel flavor | No boil over - |

TABLE I-continued
PROCESS PARAMETERS FOR OBTAINING CARAMEL BUTTERSCOTCH AQUEOUS PHASE COMPOSITIONS

| Example No. | Catalyst | Catalyst Concentration (%) | Time (Hrs.) | Temperature (°F.) | Taste Evaluation (Aqueous Phase) | Taste Evaluation and Comments (Formulated Syrup) |
|---|---|---|---|---|---|---|
| 5 | Sodium Bicarbonate | 0.02 | 3 | 210 | Moderate caramel flavor | No impact No impact |
| 6 | Sodium Carbonate | 0.05 | 2 | 210 | Good butterscotch flavor | No impact |
| 7 | Sodium Carbonate | 0.16 | 2 | 210 | Potent butterscotch flavor; however, this is due to the presence of fat; not a fat free aqueous phase. | No taste evaluation (poor product physically) |
| 8 | Sodium Carbonate | 0.08 | 2 | 220 | Strong butterscotch flavor; however, fat is still present. | No taste evaluation (poor product physically) |
| 9 | Sodium Carbonate | 0.01 | 2 | 220 | Weak butterscotch flavor | Poor flavor impact (only slight physical separation problem) |
| 10 | Sodium Citrate | 0.01 | 1 | 200 | Flavor was better than without catalyst. | No impact |
| 11 | Ammonium Carbonate | 0.01 | 1 | 200 | Buttery flavor | Slight impact |
| 12 | Ammonium Carbonate | 0.01 | 2 | 200 | Buttery-slight caramel flavor | Slight impact |
| 13 | Ammonium Carbonate | 0.05 | 3 | 210 | Excellent caramel butterscotch flavor | Excellent impact |
| 14 | Ammonium Hydroxide | 0.05 | 3 | 220 | Excellent caramel butterscotch flavor | Excellent impact equal to ammonium carbonate 0.05% |
| 15 | Ammonium Hydroxide | 0.20 | 45 min. | 220 | Potent caramel butterscotch flavor | Excellent impact |
| 16 | Ammonium Hydroxide | 0.30 | 30 min. | 220 | Fat suspended within aqueous phase - at this level hydroxide acted as an emulsifier | — |
| 17 | Ammonium Hydroxide | 0.20 | 30 min. | 220 | Excellent caramel butterscotch flavor | Good impact |
|  | Sodium Hydroxide | 0.035 | 3 | 220 | Excellent caramel butterscotch flavor | Good impact |

Aqueous phase flavor compositions derived from the Examples in Table I were incorporated at the 5% level in a low calorie syrup whose formulation is listed in Table II.

Example 1, typical of a formulation within U.S. Pat. No. 4,684,532, provided an aqueous phase composition with a buttery flavor. However, upon incorporation into syrup at the 5% level, the resulting formulation had no significant flavor impact. A similar non-catalyzed composition which was heated at a slightly higher temperature provided a buttery tasting aqueous phase composition with a weak caramel butterscotch note. When 5% of the composition was blended in a low calorie syrup, a very slight flavor impact was found by the evaluation panel.

Examples 3–5 tested the use of baking soda (sodium bicarbonate) at three different concentration levels. When present at 0.05%, the sodium bicarbonate containing syrup formula boiled-over consistently; therefore, the flavor composition is considered not formulatable with the syrup. When the concentration of sodium bicarbonate was reduced to 0.02%, a moderate caramel flavor was found in the aqueous phase composition but incorporation of said composition into the syrup formulation provided a product of no taste impact. Sodium bicarbonate at 0.01% imparted only a weak caramel flavor to the aqueous phase composition, although there were no boiling-over problems associated with forming the syrup.

Examples 6–9 evaluated the effect of sodium carbonate as a catalyst. High concentrations of sodium carbonate, as in Examples 7–8 provided strong to potent butterscotch flavor in the aqueous phase composition. However, fat was still present in the aqueous phase and, it is believed, the fat presence contributed to the flavor. The aqueous phase composition was difficult to centrifuge, the carbonate acting as an emulsifier. Fat was not completely separable and, therefore, a proper taste evaluation was not performable. Example 6 run with 0.05% sodium carbonate achieved a good butterscotch flavor. However, when the aqueous phase composition resulting therefrom was incorporated with a syrup, the formulation had no taste impact. Lowering of the sodium carbonate level to 0.01% resulted in a weak butterscotch flavor. Syrup incorporating that aqueous phase flavor composition did not exhibit fat separation but also did not have significant flavor impact.

Example 10 illustrates the use of sodium citrate at 0.01%. Flavor in the aqueous phase composition was better than that without catalyst, e.g. Example 1. No separation problems occurred with the formulated syrup but the taste impact therein was only slight.

Examples 11–13 report the effect of ammonium carbonate. Optimum caramel butterscotch flavor was obtained at a 0.05% catalyst level. When the aqueous phase composition was blended with the syrup formulation, a very good taste impact was noted by the evaluation panel. No separation problem occurred. Good, although slightly weaker flavor impact was noted on syrup that incorporated an aqueous phase using ammonium carbonate at 0.01%. Through experiments 11–13, it was noted that a flavor optimum was reached as the color turned from golden to brown; that is, deeper color indicated stronger flavor.

Examples 14–17 illustrate the effect of ammonium hydroxide. Reaction times can be reduced from 3 hours down to 45 minutes by increasing the catalyst level from 0.05 up to 0.20% by weight, respectively. At a level of 0.30%, the ammonium hydroxide caused the fat to be suspended within the aqueous phase. At this level, ammonium hydroxide acted as an emulsifier and was unsuitable for purposes of obtaining a clear product.

Example 18 investigated the use of sodium hydroxide. This was an excellent catalyst and highly effective at very low levels, i.e. 0.035% by weight.

EXAMPLE 19

An illustration of a reduced calorie syrup of the present invention, and the formula used in the taste evaluations of Example 1, is set forth below.

TABLE II

Reduced Calorie Table Syrup

| Ingredient | Weight % |
|---|---|
| Sucrose | 35.00 |
| Corn Syrup 42 DE | 13.00 |
| High Fructose Corn Syrup | 7.00 |
| Caramel Butterscotch Flavor Aqueous Phase | 5.00 |
| Gum: | 0.76 |
| Propylene Glycol Alginate | |
| Sodium Carboxymethyl Cellulose | |
| Natural and Artificial Flavors/Colors | 0.725 |
| Salt | 0.30 |
| Sodium Benzoate/Sorbic Acid | 0.10 |
| Sodium Hexametaphosphate | 0.07 |
| Water | Balance |

EXAMPLES 20–25

The present Examples were used to investigate the effect of pH upon flavor generation.

TABLE III

Effect of pH

| Example No. | Catalyst | Concentration (wt. %) | pH Before Cooking | pH After Cooking | Taste Evaluation (Aqueous Phase) | Taste Evaluation (Formulated Syrup) |
|---|---|---|---|---|---|---|
| 20 | None | — | 6.6 | — | — | No impact |
| 21 | Ammonium Hydroxide | 0.05 | 8.0 | 5.6 | Excellent caramel butterscotch | Good impact |
| 22 | Ammonium Citrate | 0.05 | 5.6 | 5.7 | — | No impact |
| 23 | Sodium Hydroxide | 0.05 | 7.5 | 7.0 | Excellent caramel butterscotch | Good Impact |
| 24 | Ammonium Hydroxide | 0.2 | 9.4 | 8.2 | Potent butterscotch flavor | Good Impact |
| 25 | Ammonium Hydroxide | 0.4 | 9.2 | — | Too much fat suspended within aqueous phase. At this level ammonium hydroxide is acting as emulsifier | — |

All catalysts in Table III were present at 0.05%. Without catalyst, such as in Example 20, the resultant aqueous phase did not impart a flavor impact to low calorie syrup. Example 22, wherein ammonium citrate was employed as a catalyst, provided an aqueous phase composition that when incorporated into a syrup did not provide the product with any significant flavor impact. By contrast, Example 21 demonstrates that use of ammonium hydroxide as a catalyst generated an aqueous phase flavor that imparted a taste impact upon low calorie syrup. The difference in result between Examples 21 and 22 may be attributed to the difference in pH. Evidently, a pH of at least 7 is required to generate the appropriate flavor. Example 23 was run with sodium hydroxide as a catalyst; excellent taste impact was achieved. Example 24 utilizing ammonium hydroxide provided a pH of 9.4 which rendered a potent butterscotch flavor with good impact in the formulated syrup.

The foregoing description and examples illustrate selected embodiments of the present invention and in light thereof variations and modifications will be suggested to one skilled in the art all of which are in the spirit and purview of this invention.

What is claimed is:

1. A method for preparing a caramel butterscotch flavored composition comprising the steps of:
   (i) heating an admixture of an aqueous solution of sugar and butter in a butter to sugar ratio of 50:1 to 1:10 at a temperature of about 100° F. to 250° F. for about 0.5 to 5 hours resulting in formation of an oil in sugar water emulsion,
   said admixture also containing from about 0.01 to 0.2% of a catalyst comprising a basic compound selected from the group consisting of ammonium hydroxide and ammonium carbonate which allows the admixture, prior to being heated, to attain a pH of at least 7; and
   (ii) separating a fatty phase from the emulsion and recovering an aqueous phase, said aqueous phase having a caramel butterscotch flavor.

2. A method according to claim 1 wherein said catalyst is ammonium hydroxide.

3. A method according to claim 1 wherein said catalyst is ammonium carbonate.

4. A method according to claim 1 wherein said pH ranges from 7 to 8.

5. A method according to claim 1 wherein the ratio of sugar to butter is about 5:1.

6. A method according to claim 1 wherein the cooking temperature is from about 150° to about 230° F.

7. A method according to claim 1 wherein the cooking temperature is about 180° F.

8. A method according to claim 1 wherein the separation of aqueous from fatty phase in step (ii) is achieved by means of a centrifuge.

* * * * *